United States Patent [19]

Axelrod et al.

[11] 4,124,290
[45] Nov. 7, 1978

[54] SYSTEM FOR INTERFACING AN AUTOMATIC PROCESSING MACHINE WITH A STACK OF DOCUMENTS WHICH IT IS PROCESSING

[75] Inventors: Donald J. Axelrod, Glenview; John R. Flint, Barrington, both of Ill.

[73] Assignee: Bell & Howell Company, Chicago, Ill.

[21] Appl. No.: 793,650

[22] Filed: May 4, 1977

[51] Int. Cl.² .................................................. G03B 27/52
[52] U.S. Cl. ........................................ 355/41; 250/555; 355/64
[58] Field of Search .................. 355/40, 50, 51, 64, 355/65, 41; 250/555, 566, 571

[56] References Cited

U.S. PATENT DOCUMENTS

| | | | |
|---|---|---|---|
| 3,354,774 | 11/1967 | Smitzer et al. | 355/64 X |
| 3,922,084 | 11/1975 | Burton et al. | 355/64 X |

*Primary Examiner*—Richard A. Wintercorn
*Attorney, Agent, or Firm*—H. G. Thibault; A. B. Samlan

[57] ABSTRACT

A stack of documents are transported one-at-a-time, under control of an automatic machine. A machine readable card is inserted between preselected documents in the stack. When the transport detects a passage of the card through the transport system, the machine is commanded to perform a specific function. The exemplary machine described herein is a microfilm camera, and the illustrative functions are two side copying and batch or file marking.

7 Claims, 3 Drawing Figures

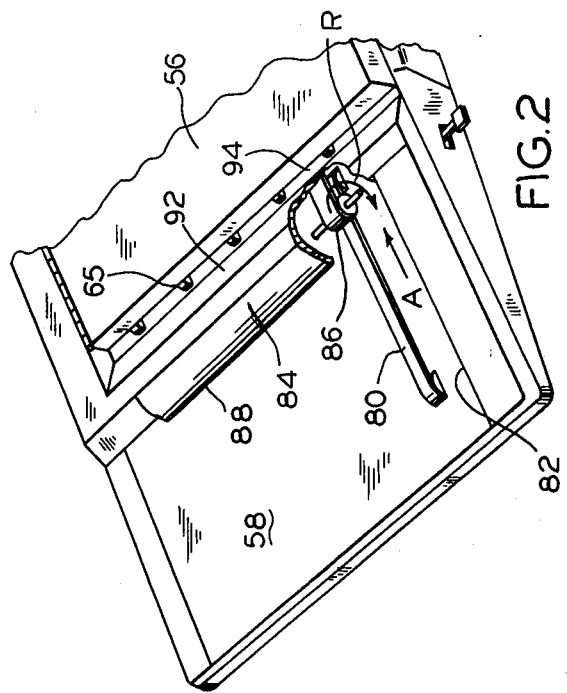
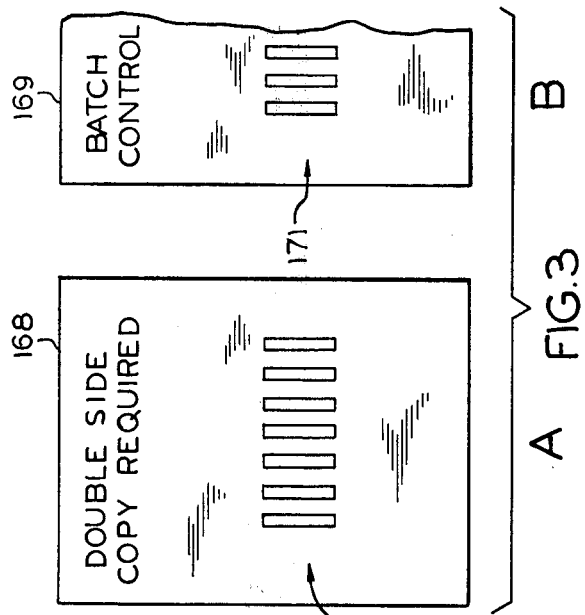
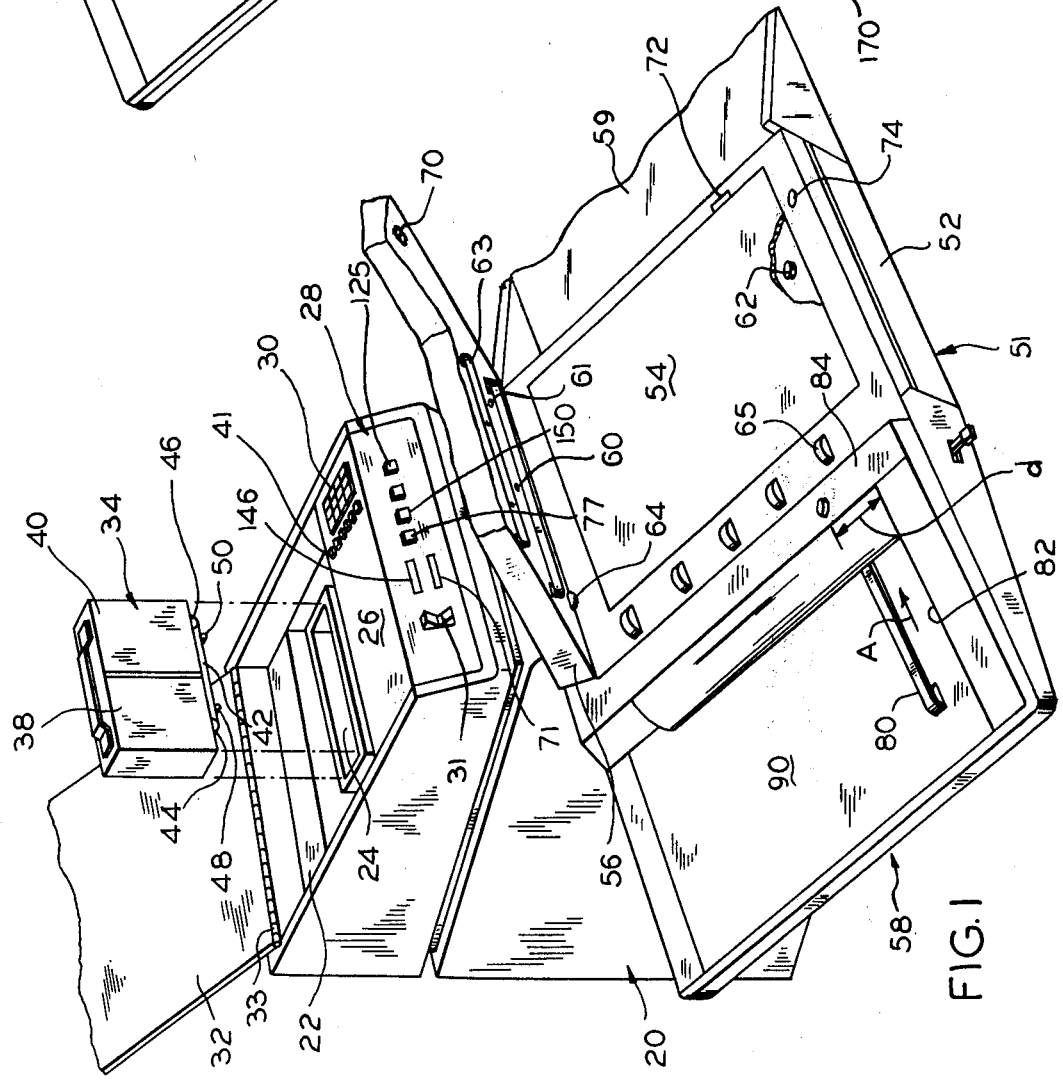

SYSTEM FOR INTERFACING AN AUTOMATIC PROCESSING MACHINE WITH A STACK OF DOCUMENTS WHICH IT IS PROCESSING

This invention relates to document sensing systems and more particularly to systems for providing an interface between a document processing apparatus and a human operator.

Document processing systems may take any of many different forms, one example of which is found in a copending application entitled "Automatic Microfilm Camera, Ser. No. 821,279, filed Aug. 3, 1977, by Donald Axelrod, inventor, and assigned to the assignee of this application. In this particular application, there is a stack feeder which receives a plurality of documents, transports them one-at-a-time, and feeds them through a conveyor belt system to an output tray. The feeder and conveyor systems are controlled by a suitable automatic control system, such as a microprocessor, for example, which relieves the human operator from close decision making attention to the machine operation.

The microprocessor may be programmed to attend to all routine operations and to make decisions which are predictable. However, human intervention is still required when events are not predictable or occur in an unprogrammable or random manner. Hence, there is a need for interfacing the human and the machine control functions. For example, it may become necessary to stop the machine, retrieve a document, perform a function, and return the document to the machine.

An illustration of such an operation is found in a microfilm camera making photocopies of one side of each in a stack of documents. If it should become necessary or desirable to stop the machine and turn over a document in order to photocopy its opposite side, there must be some way to identify the document which should be turned over since all documents look alike to the machine.

This is only one of many examples which could be cited. There are many times when and places where it may be necessary or desirable for the operator to pre-program a document feeder or transport mechanism to perform a specific and unique function when a particular one of many documents is found.

Accordingly, an object of the invention is to provide new and improved means for and methods of interfacing human operators and automatically controlled machines for feeding and transporting documents.

Another object is to provide simple and easy ways of programming a document manipulating machine to perform preselected functions responsive to a passage of a predetermined document through the machine.

A further object is to accomplish the foregoing objects in a machine which is controlled by a computer or microprocessor.

In keeping with an aspect of the invention, these and other objects are accomplished by providing a plurality of header cards, each having an encoded series of markers thereon. A particular card is selected, according to the function desired, and slipped into a stack of documents, prior to the predetermined document. When the documents are transported through a document handling machine, the encoded markers are detected, decoded, and the machine performs a special function, as commanded by the encoding.

The nature of a preferred embodiment of the invention will become more apparent from a study of the attached drawings, wherein:

FIG. 1 is a perspective view of a microfilm camera, which is exemplary of a document handling system that might be used in connection with the invention;

FIG. 2 is a fragmentary part of FIG. 1; and

FIG. 3 shows two exemplary header cards that might be used, in the inventive manner in order to control the machine of FIG. 1.

FIG. 1 shows the appearance and general features of a microfilm camera, that is the subject matter of the above-identified copending patent application entitled "Automatic Microfilm Camera", Donald Axelrod, inventor. Reference may be made to this application for details of the microfilm camera which are not included herein. To facilitate such a cross reference, the reference numerals of that application are used herein.

More particularly, there is a housing 20 containing a camera 22, a film cassette receptacle and guide way 24, electronic controls 26 (preferably a microprocessor), a control panel 28, and a frame identifying signal generating keyboard 30. Toggle switch 31 switches power on and off. A door 32 normally swings down on hinge 33 to cover, conceal and protect the inner workings 22, 24, 26, 30 of the camera. Door 32 is here shown in the open or servicing position.

A cassette 34 has two removable cartridges 38, 40 which contains unexposed film on one side, and exposed film on the other side. The film 42 emerges from one cartridge passes over an exposure traverse and then re-enters the other cartridge. A four-position switch 41 is operated to select any one of up to four film speeds. Of course, provisions may also be made for selecting between any number of film speeds.

After all of the unexposed film has been transported from the supply cartridge 40 to the take-up cartridge 38, the full take-up cartridge is removed from cassette 34 and the then empty supply cartridge 40 is moved over to the take-up position 38.

On the front of the housing 20 is a copy area or photographic station 51 comprising an inclined shelf 52 having a glass platen 54 and a hinged cover 56 which may swing up to the position shown in FIG. 1 or down to a document feed position shown in FIG. 2. In the up position, a book or other bulky document may be placed face down on glass plate 54.

Briefly, the automatic microfilm camera comprises a stack feeder means 58 for receiving and automatically transporting a plurality of documents, one-at-a-time past the copy area or photographic station 51, and to an output tray 59. During this document transport, a pair of photodetectors 60, 61 detects the presence of each transported document as it interrupts the light below glass platen 54 and as the document is located on glass platen 54 and within the camera's copy area. A third sensor 62 adjusts the exposure time of the camera responsive to the intensity of the light being reflected from the document within the copy area.

In greater detail, when the cover 56 is down, the documents are transported one-at-a-time from the bottom of a stack of documents in tray 90 and transported over the glass platen 54 and under the cover 56. To facilitate such a movement of the documents, the underside of the cover 56 includes a number (here five) of running belts (one of which is numbered 63). These belts are driven by a common shaft (not shown) which is turned by a gear 64 in the cover 56. Thus, when the cover 56 is open, the gear 64 is disengaged from other and driven gears inside the housing 20, and the belts 63 cannot run. When the cover 56 is closed, gear 64 meshes with the driven gear (not shown), and the belt may run, if the driver gear is then running.

Immediately beneath and driven by each of the running belts 63 is a free running idler wheel (one of which is numbered 65). When the cover 56 is closed, the idlers 65 are rotated, if the meshing belts 63 are then running.

On the underside of the cover 56 are the two photodetectors 60, 61 which receive light projected upwardly through the glass 54 by lamps (not shown) illuminating the documents. Thus, the leading edge of each document sequentially interrupts the light falling on photodetectors 60, 61. Accordingly, the camera 22 may be automatically operated responsive to photodetector 61, in order to photograph on microfilm 42 an image of a document which is then positioned on the glass 54.

Means are provided for displaying a number adjacent to each document when it is in the copy area. This number display can be manually operated so that any preselected file number may be printed on the microfilm adjacent to the photographic document image.

In greater detail, a frame identifying numerical display appears simultaneously at position 70 on the underside of cover 56, for marking the microfilm, and at position 71 on the control panel 28 for informing the operator. These displays may be LED (light emitting diode) displays similar to the displays currently used on small hand-held calculators, for example. Thus, any number which is keyed at 30 is also displayed at 70 and 71. When the cover 56 is closed, the image displayed at 70 appears in a window 72 adjacent to the document copy area, and therefore is photographed along with any document then lying on the glass platen 54. Alternatively, the operator may push a key 74 of the keyboard and the displays at 70, 71 are automatically reset to a suitable starting number such as "0000", for example. Therefore, the operator may supply any desired and suitable file number, which is recorded as a file number adjacent the document image on the microfilm.

The number displayed may be automatically advanced one digit responsive to every photographed image, or alternatively, in any other suitable manner so that multiple entries may be made under a single file number.

A stack of documents to be photocopied are placed face down in tray 90, from which they are transported, one-at-a-time, passed over the glass 54, where they are photographed, and then deposited in the output tray 59. In greater detail, a running belt 80 is positioned near the bottom edge 82 of the tray 90 and driven in direction A for transporting documents into the nip between the running belts 63 and idlers 65.

Inside cover 84 is a driven belt 86 (FIG. 2) which rotates in a direction R, that is opposite to the direction A. This driven belt 86 has a contour which tends to fan the stack of documents and pushes all documents back toward the tray 90, except for the lowermost document which is being transported forward in direction A by the running belt 80. Shield 88 helps guide each document to the interface of belts 86 and 80. There is a small interference between the driven belt 86 and the running belt 80 which causes only one document at a time to be transported forward in direction A.

Accordingly, a stack of documents of assorted lengths may be mixed indiscriminately and placed face down in tray 90. The "start" push button 77 is pushed. Then belt 80 transports the documents, one-at-a-time, from the bottom and feeds them into the running belts 63 which transport the documents through the photographic station 51, past the copy area 54, and deposits them onto the output tray 59.

According to the invention, means are provided for automatically interrupting the document transport in order to enable a feeding of a single document through the document transport mechanism during the period of interrupt.

The microfilm camera is controlled by a suitable electronic control circuit, such as a microprocessor or computer. Therefore, it is desirable to provide an interface between the human operator and that control circuit. This interface is provided by a number of encoded header cards 168, 169, as shown in FIG. 3. Each card contains a suitable machine readable code, such as a series of slots, holes, light reflective tape, or other detectable marks shown at 170 and 171. These marks are made long enough so that they may be read by photodetector 60, (FIG. 1) regardless of how badly (within reason) they might be misaligned in the reader. The photodetector 60 produces a train of pulses as the light falling on it is modified by the marks 170 or 171 in the header card. Each mark is read as two transitions (dark to light and light to dark). Also, the width of and spacing between marks 170 and 171 are such that the resulting pulses produced by the photodetector 60, are not duplicated by other machine read code marks that are likely to be encountered by the microfilm camera control circuit. For example, many checks are printed on punched cards, which are normally read by computers, and holes 170, 171 must not simulate holes in the punched cards which are likely to be photocopied by the camera of FIG. 1.

The operator of the camera will have at her disposal a number of these header cards with different encoded marks on them. By way of example, FIG. 3A shows a header card 168 with seven marks 170 and FIG. 3B shows a header card 169 with three marks 171. In addition, each header card also has information printed thereon in English or another language which can be read by the operator. For example, the header card of FIG. 3A may have printed thereon "Double Side Copy Required". The header card of FIG. 3B may have "Batch Control" printed on it. Of course, any other suitable headings and any other suitable number of slots may also be provided. Thus, when the operator assembles a stack of documents for copying, she inserts a suitable header card whenever she considers it necessary or desirable to have the microfilm camera perform a specific function. For example, at the beginning of a stack of documents relating to a single file, the operator may place the batch control header card 169 of FIG. 3B. Likewise, she may place card 168 (FIG. 3A) in the stack before any document which must be turned over so that both of its two sides may be copied.

When their turns come up, these header cards (FIG. 3) feed through the machine and the photodetector 60 generates trains of encoded pulses that command desired functions. For example, a light emitting diode may be lit responsive to passage of card 169 to form a blip mark adjacent to the microfilm frame which is then being photographed in order to make a batch or file mark on the film. The resultant film when used with an automatic search machine can perform a high speed search by counting these batch or file marks, or the batch or file mark may stop the automatic search machine so that a new file number displayed on the film may be located.

If the header card 168 of FIG. 3A is included in the stack of documents, the automatic feed is stopped. The operator hand refeeds the last document, and then automatic feed resumes.

In greater detail, for this feeding of single documents during an interruption of the stack load feeder, the top of cover 84 (FIG. 1) is built with a sloping surface 92 which guides and directs a document into a slot 94 between cover 84 and cover 56 (when closed). The bottom of slot 94 is immediately in front of the nip between running belts 63 and idlers 65. The angle of surface 92 guides the hand-fed document into the nip.

To copy two sides of a single document in adjacent frames on a microfilm strip, the operator first places a header card 168 just prior to the designated document in the stack loading tray 90. This header card 168 is transported from the stack loading tray 90 into the grip of the transport belts 63 and nip rollers 65. When this card 168 passes by the photodetector 60, which detects the code marks 170, the microprocessor receives these code marks which control the transport logic for this card 168 and for the succeeding document in the stack. The header card 168 is not photocopied, but it moves directly to the output tray 59. The next document is photocopied in a normal manner.

After the photography has been completed, this document moves to the output tray, but the next document in the stack feeder is not fed. Rather, a visible and audible signal is presented to the operator, thereby instructing her to pick up, turn over, and insert the last copied document into slot 94, thereby depositing it in the grip of the transport belts 63 and nip rollers 65 at a point between the stack feeder 58 and the copy area 54. At this point in time, the microfilm camera returns to its normal state and continues photographing documents, as they are transported from the document feeder to tray 59.

In a similar manner, any suitable number of header cards may be provided to perform any suitable functions. Each header card is transported as all documents are transported through the machine. None of the header cards are copied by the camera 22. However, the electronic controls of the camera perform the commanded functions.

The invention is not limited to the structure shown and described herein. Nor is it necessarily limited to either cameras or microfilming. Quite the contrary, the invention will find use wherever it is necessary or desirable to automatically transport documents or other similar structures and to perform specific functions after the transport of preselected documents. Therefore, the appended claims are to be construed broadly enough to cover all equivalent structures falling within the scope and the spirit of the invention.

We claim:

1. A system for interfacing a microfilm camera with a stack of documents which it is processing, said system comprising means for transporting said documents one-at-a-time to said camera to be photographed, at least one card being transportable along with said documents having machine readable encoded marks thereon for insertion between preselected documents in said stack, and means responsive to said encoded marks for supplying input signals, means for displaying a file number or an automatic searching blip mark adjacent each image photographed on microfilm and processing means responsive to said input signals for controlling the displayed file number or blip mark.

2. The system of claim 1 wherein one of said cards is encoded to interrupt said transport means, means for changing the displayed file number or blip mark during said interrupt, and means for thereafter resuming said transport of said documents.

3. A microfilm camera control process comprising the steps of:
    (a) providing encoded cards, each having an encoded series of machine readable marks thereon,
    (b) slipping into a stack of documents, adjacent at least one predetermined document, a preselected one of said cards which is selected according to a desired function, being displaying a file number or an automatic searching blip mark adjacent each image photographed on microfilm,
    (c) presenting the documents one-at-a-time for processing,
    (d) reading the encoded marks when the card is presented for processing, and
    (e) commanding said camera to perform said desired function which is indicated by said marks on the read card.

4. The process of claim 3 and the added steps of:
    (f) controlling said machine by a main program of a programmable electronic circuit;
    (g) reading the encoded series of marks when said card is presented for processing, and
    (h) causing said electronic circuit to switch from said main program and to follow a supplemental program responsive the reading of said encoded cards.

5. The process of claim 4 and the added steps wherein said supplemental program stops said presentation of said documents for processing and resumes said presentation of said documents after the performance of said desired function.

6. A system for interfacing a microfilm camera with a stack of documents which it is processing, said system comprising means for transporting said documents one-at-a-time to said camera to be photographed, at least one card being transportable along with said documents having machine readable encoded marks thereon for insertion between preselected documents in said stack, and means responsive to said encoded marks for supplying input signals to a processing means to interrupt said transport means, means to manually insert a document to said camera to be photographed during said interrupt, and means for thereafter resuming said transport of said documents.

7. The system of claim 6 wherein said transport means is interrupted after a document following said encoded card is photographed whereby the reverse side of said following documents may be manually inserted by photographing.

* * * * *